United States Patent [19] [11] 3,963,829
Johnson [45] June 15, 1976

[54] RARE EARTH MANGANESE SILICIDES

[75] Inventor: Vancliff Johnson, Wilmington, Del.

[73] Assignee: E. I. Du Pont de Nemours and Company, Wilmington, Del.

[22] Filed: July 12, 1974

[21] Appl. No.: 488,236

[52] U.S. Cl. .................. 423/263; 423/324; 252/62.51

[51] Int. Cl.[2] .................. C01F 17/00; C01B 33/00

[58] Field of Search .................. 423/263, 324; 75/80, 75/84, 152; 252/62.51, 62.55

[56] References Cited

UNITED STATES PATENTS

| | | | |
|---|---|---|---|
| 2,926,080 | 2/1960 | Motz et al. | 75/27 |
| 3,264,093 | 8/1966 | Sump | 423/263 X |

OTHER PUBLICATIONS

Bodak, et al., "Zhurnal Strukturnoi Khimii," vol. 11, No. 2, pp. 305–310, Mar.–Apr. 1970.

Mayer, et al., "Journal of Solid State Chem." vol. 7, 1973, pp. 292–296.

*Primary Examiner*—Herbert T. Carter

[57] ABSTRACT

Compositions of the formula $GdMn_{1-x}Fe_xSi$ where $0<x \leq 0.5$ or LnMnSi where Ln is at least one of Gd, La or Y can be made by heating stoichiometric amounts of the elements or composition of two or more thereof. The compositions are magnetic with Curie temperatures in the range 275°–330°K. and can be used in thermally activated magnetic switches.

8 Claims, 1 Drawing Figure

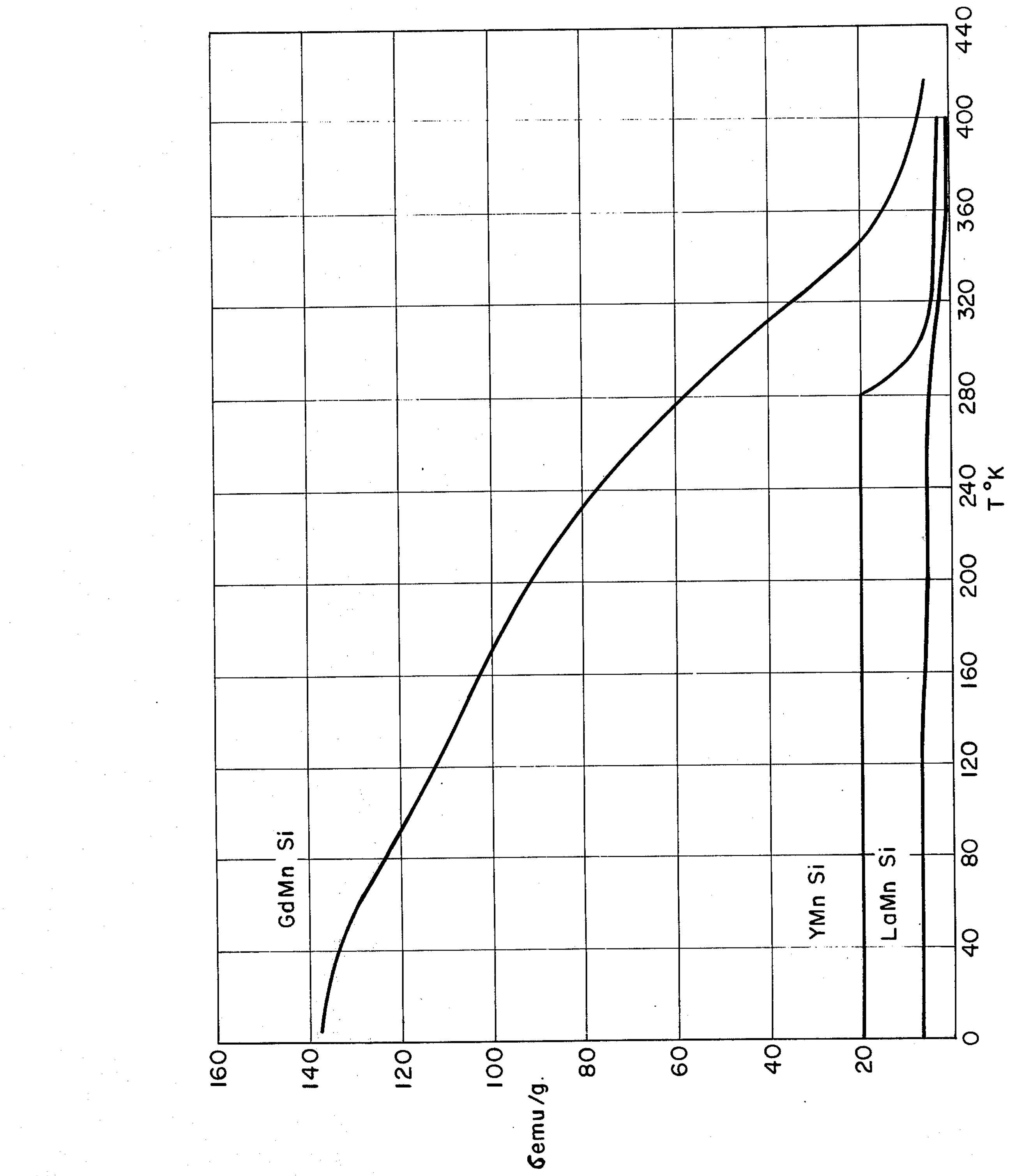
GdMn Si
YMn Si
LaMn Si
σemu/g.
T °K
160
140
120
100
80
60
40
20
0
40
80
120
160
200
240
280
320
360
400
440

RARE EARTH MANGANESE SILICIDES

BACKGROUND OF THE INVENTION

1. Field of the Invention

This invention relates to novel magnetic compounds having convenient Curie temperatures for thermomagnetic applications.

2. The Prior Art

A number of ternary rare earth-transition metal silicides are known having the stoichiometry LnMSi where Ln is a lanthanide rare earth metal and M is a transition metal. Mayer and Felner (Journal of Solid State Chemistry 7, 292–296 (1973)) have described a series of compositions where M is Fe, Co, Ni or Ag and Ln is Nd or certain other lanthanide elements. A much broader range of lanthanide elements including the pseudo-lanthanide yttrium has been reported having the stoichiometry LnMSi where M is Fe, Co or Ni by Bodak and co-workers (see, e.g., O. I. Bodak, E. I. Gladyshevskii, and P. I. Kripyakevich, Zhurnal Strukturnoi Khimii, Vol. 11, No. 2, pp. 305–10 (1970)).

SUMMARY OF THE INVENTION

The compositions of the present invention have the formula $$GdMn_{1-x}Fe_xSi \text{ or } LnMnSi$$

where $0<x \leq 0.5$ and Ln is one or more of Gd, La or Y and are characterized by tetragonal, ordered $Cu_2Sb$-type structures. Preferably $x$ is at least 0.01 and most preferably 0.1 to 0.3.

THE DRAWINGS AND DETAILED DESCRIPTION OF THE INVENTION

The present invention is concerned with new magnetic compositions having the general formula $GdMn_{1-x}Fe_xSi$ when $0<x \leq 0.5$ or LnMnSi wherein Ln is one of La, Gd or Y. These compositions stand in marked contrast to compositions of analogous stoichiometry previously known or suggested. Attempts to replace the elements La, Gd or Y with normally analogous lanthanide elements similarly yield compositions which are nonmagnetic at conventionally useful temperatures.

Particular compositions of the invention — LaMnSi, GdMnSi and YMnSi — have magnetic Curie temperatures of approximately 305°, 295° and 275°K., respectively, and thus offer magnetic switching capabilities uniquely suited to human convenience in the region of ambient temperature. Furthermore, by partial substitution among these three particular lanthanide elements magnetic switching performance may be designed for a specific temperature point within a region from below the freezing point to about normal body temperature.

It is particularly surprising that the substitution of some Fe for the Mn in GdMnSi leads not to a lowering of the magnetic Curie temperature toward tht of the known compound GdFeSi, but instead increases the Curie temperature as much as 25°C. above that of the pure GdMnSi. Thus the compositions $GdMn_{1-x}Fe_xSi$ where $x$ is up to about 0.5 are particularly preferred for magnetic switches operating above body temperature. As will be seen below the gadolinium-containing compositions $GdMn_{1-x}Fe_xSi$, especially where $x=0$ also offer larger magnetization than do the La or Y compounds.

The compositions of the invention may be readily identified by their X-ray diffraction pattern. The characteristic diffraction lines are shown in Table I. The patterns are identified with isotypic tetragonal structures with the observed d-spacings assignable to the indicated lattice reflections. The tetragonal unit cell dimensions for some compositions are shown in Table II. The relative intensities of the reflections indicate that the compositions have the ordered $Cu_2Sb$-type structure. This is equivalent to the anti-PbFCl structure reported by Bodak (cited above) for silicides of the higher transition metals. Solid solutions containing more than one of the elements La, Gd or Y may be expected to show unit cell dimensions intermediate their end members. The axial ratio for each of the three ternary compounds is about the same ($c/a = 1.78$) and the cell volumes show the expected order (V in $A^3 =$ 112.8 for Y, 116.1 for Gd and 130.2 for La). The substitution of iron for manganese in GdMnSi leads to the anticipated linear decrease in cell volume. The axial ratio increases somewhat as up to about half of the Mn is replaced by Fe and thereafter decreases abruptly to the lower value for the nonmagnetic composition GdFeSi.

Slight changes in the lattice parameters may result from small variations in the equiatomic proportions of the elements. It is well recognized that in ternary silicide phases of this type the relative similarity in atomic sizes permits some latitude in the nominal stoichiometry. Such variations may in fact commonly occur within the limits of customary analytical accuracy. Their occurrence in amounts up to about ten percent consistent with the essential structure and thermomagnetic properties is considered within the meaning of the formula LnMnSi. It will also be understood that lanthanides other than La, Gd and Y also form the same structure, and while not themselves producing the valuable thermomagnetic properties attributable to the three cited lanthanides, may be substituted for them in small amount without departing from the teachings of the invention.

The products are ferromagnetic in the operational sense, i.e., they have those properties associated with spontaneous magnetic moment. The term ferromagnetic is also meant to include tht behavior resulting from partially compensated magnetic moments in a structure (ferrimagnetism).

In the accompanying drawing, the FIGURE shows comparative values of magnetization, $\sigma$ (emu/g) versus temperature (°K.) for each of the three ternary compounds. These values are measured in a large external field (16,000 Oersteds) to show attainable levels of magnetization. At such fields the compositions, particularly those of Y and La, are still not magnetically saturated at 4.2 °K. For higher precision, the Curie temperatures are determined from measurements of $\sigma$ versus T at lower fields, 75 Oersteds, where the change in magnetizaton at the Curie temperature is relatively sharp in each case. In any field the Y compound provides relatively constant magnetization right up to the sudden change at the Curie temperature of about 275°K. The Gd ternary composition by contrast offers greater magnetization which however gradually decreases with temperature until the drop at the Curie temperature which is quite sharp at low fields. The products of this invention are also expected to provide useful magnetooptic properties. For this purpose both the manganese and gadolinium (as well as Fe) provide favorable contributions to the magnetic moment which can be fully utilized in this uniaxial crystal form. The plate-like crystal habit permits preparation of thin translucent films with the c axis perpendicular to the film plane. This orientation is desirable in a magnetooptic medium.

The compounds can be made by fusing the elements or suitable compounds thereof together in the stoichiometric amounts in an inert atmosphere, preferably inert noble gas. Prolonged annealing at 600° to 800°C. may be needed to obtain a single-phase product.

SPECIFIC EMBODIMENTS OF THE INVENTION

This invention is further illustrated by the following specific embodiments, which should not however be construed as fully delineating the scope of this discovery.

EXAMPLE 1

GdMnSi

An equimolar mixture was prepared from 2.1953 g. Gd (pure ingot), 0.7670 g. Mn (remelted pure) and 0.3921 g. Si (semiconductor grade). The mixture was arc-melted three successive times under gettered argon. The quenched ingot had undergone significant weight loss (3.8 percent). It was strongly magnetic at room temperature, but rough Curie temperature measurements suggested the presence of two magnetic phases. The product was then ground, sealed into an evacuated silica tube, and annealed for five days at 700°C. An X-ray powder pattern of the product indicated a structure of the anti-PbFCl or $Cu_2Sb$-type, which could be indexed on the basis of a tetragonal cell, $a = 4.02$, $c = 7.16$.

EXAMPLE 2

An equimolar alloy GdSi was prepared by arc-melting 8.4846 g. Gd with 1.5154 g. Si. The weight loss on arc-melting was only 0.2 percent. A portion of this product (3.8568 g.) was mixed with 1.1432 g. Mn in an alumina crucible sealed within an evacuated silica tube. After heating at 800°C. for two days, followed by slow cooling in the furnace the product showed a $Cu_2Sb$-type tetragonal diffraction pattern and was magnetic at room temperature. A portion of this composition GdMnSi was ground and pressed into a ⅜ inch diameter pellet. The pellet in an alumina vessel was sealed in an evacuated silica tube and again heated at 800°C. for three days followed by slow cooling. The X-ray diffraction pattern was measured using a Guinier-Hagg camera and the data refined by a least squares program to give the results shown for GdMnSi in Table I.

This GdMnSi sample was weakly magnetic at room temperature but strongly magnetic at 0°C. The Curie temperature was determined to be 295°C.

A portion of this GdMnSi was fixed to the surface of a nonmagnetic, flexible metal strip with silver paste. In conjunction with electrical leads and a permanent magnet the movable GdMnSi surface formed a switch element closing when the surface was attracted to the magenet. When this switch element was cooled in ice-water the electrically conductive and strongly magnetic GdMnSi closed an electrical circuit containing a battery and light bulb. The light bulb remained lit until the ice-water had been warmed to room temperature, whereupon the switch opened and the light went out.

EXAMPLE 3

Previously arc-melted and powdered LaSi was used for this preparation. 3.3398 gm. LaSi and 1.0988 gm. Mn were mixed as powders in an agate mortar, sealed under vacuum in a silica tube lined with a graphite crucible and fired at 800°C. for three days. The sample was cooled at the natural rate of cooling of the furnace (~5 hrs.) to room temperature. X-ray diffraction of the product showed the major phase to be LaMnSi with a $Cu_2Sb$-type structure having tetragonal lattice parameters $a = 4.185$A, $c = 7.433$A. The diffraction pattern also contained weak lines which could be assigned to a small amount of $LaMn_2Si_2$ which presumably formed when some La was abstracted by the graphite.

The sample was magnetic with an indicated Curie temperature of 305°K. A subsequent preparation of pure $LaMn_2Si_2$ confirmed that it was non-magnetic and not responsible for any magnetic contribution to this sample.

EXAMPLE 4

Previously arc-melted and powdered YSi was used for this preparation. 2.0414 gm. YSi and 0.9586 gm. Mn powder were mixed, sealed in an $Al_2O_3$/lined silica tube at 1000°C. for 16 hours and quenched. The diffraction pattern showed the tetragonal ordered $Cu_2Sb$-type structure with $a = 3.984$A, $c = 7.106$A corresponding to the compound YMnSi. Also present was a small amount of a phase later shown to be the non-magnetic $YMn_2Si_2$. This sample of YMnSi was non-magnetic at room temperature but was magnetic at 77°K. The Curie temperature was found to be 275°K.

TABLE I

X-Ray Diffraction Pattern of LnMnSi Phases

| Index | d-spacings (A) LaMnSi | GdMnSi | YMnSi |
|---|---|---|---|
| h k l | | d | |
| 0 0 2 | — | 3.586 | — |
| 1 0 1 | 3.645 | 3.509 | 3.477 |
| 1 1 0 | 2.957 | 2.845 | 2.820 |
| 1 0 2 | 2.769 | 2.678 | 2.650 |
| 1 1 1 | 2.753 | 2.645 | 2.620 |
| 0 0 3 | 2.473 | 2.391 | 2.372 |
| 1 1 2 | 2.313 | 2.229 | 2.210 |
| 1 0 3 | — | 2.053 | 2.034 |
| 2 0 0 | 2.097 | 2.011 | 1.992 |
| 1 1 3 | — | 1.830 | — |
| 2 1 1 | 1.816 | 1.745 | 1.729 |
| 1 0 4 | — | 1.639 | 1.622 |
| 2 1 2 | 1.671 | 1.608 | 1.594 |
| 2 0 3 | 1.596 | 1.539 | 1.524 |
| 1 1 4 | — | 1.517 | 1.504 |
| 2 2 0 | 1.480 | 1.422 | 1.409 |

EXAMPLES 5–10

Compositions in the series $GdMn_{1-x}Fe_xSi$ were prepared in the manner described for Example 2. Master alloys $GdFe_xSi$ were first prepared by arc-melting the elements under argon in the appropriate quantities. These were then powdered, mixed with Mn powder in the desired stoichiometry and heated in alumina-lined silica tubes between 800° and 1000°C. In each case the product was characterized by the tetragonal ordered $Cu_2Sb$-type crystal structure. The lattice parameters and magnetic properties are shown in Table II for various values of $x$. The nonmagnetic compound where $x = 1.0$, not a part of this invention, is shown as a control.

TABLE II

| | | | Properties of $LnMn_{1-x}Fe_xSi$ | | | |
|---|---|---|---|---|---|---|
| Example | Ln | x | a (A) | c (A) | $T_c$(°K.)* | $\sigma$77°K.(emu/g.)** |
| 2 | Gd | 0 | 4.023 | 7.175 | 295 | 124 |
| 5 | " | 0.10 | 4.019 | 7.179 | 318 | 84 |
| 6 | " | 0.15 | — | — | 318 | 67 |
| 7 | " | 0.20 | 4.000 | 7.170 | 330 | 79 |
| 8 | " | 0.25 | — | — | 320 | 78 |
| 9 | " | 0.30 | — | — | 320 | 78 |
| 10 | " | 0.50 | 3.975 | 7.143 | 310 | 91 |
| Control | " | 1.00 | 4.008 | 6.806 | <77 | — |
| 3 | La | 0 | 4.185 | 7.433 | 305 | 6 |
| 4 | Y | 0 | 3.984 | 7.106 | 275 | 20 |

*Curie temperature measured in a field of 75 Oersteds
**Magnetization measured in a field of 16,000 Oersteds The embodiments of this invention in which one exclusive property or privilege is claimed are defined as follows.

1. A ferromagnetic compound having the formula $GdMn_{1-x}Fe_xSi$ or LnMnSi wherein $0<x \leq 0.5$ and Ln is at least one of Gd, La or Y characterized by a tetragonal $Cu_2Sb$-type crystal structure and a Curie temperature in the range of about 275°–330°K.

2. A compound of claim 1 having the formula $GdMn_{1-x}Fe_xSi$.

3. A compound of claim 1 having the formula LnMnSi.

4. A compound of claim 3 wherein Ln is Gd.

5. A compound of claim 3 wherein Ln is La.

6. A compound of claim 3 wherein Ln is Y.

7. A compound of claim 2 wherein $x$ is at least 0.01.

8. A compound of claim 2 wherein $x$ is 0.1 to 0.3.

* * * * *